20

2,915,559

ALKYLPHENOXYPOLYOXYGLYCOL NONIONIC SURFACE-ACTIVE AGENTS

Lee H. Horsley and Harold O. Seeburger, Midland, Mich., assignors to The Dow Chemical Company, Midland, Mich., a corporation of Delaware No Drawing. Application December 10, 1956
Serial No. 627,128

13 Claims. (Cl. 260—613)

This invention relates to a new class of nonionic surfactants having exceptional activity at low concentrations and being particularly adapted to use in emulsifying agricultural sprays and the like, where a combination of high surface activity and low foaming tendency at low concentrations is extremely desirable.

The compounds of the invention are alkylphenyl monoethers of polyoxyalkylene glycols corresponding to the formula

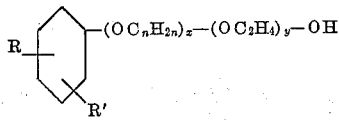

wherein R and R' are hydrogen or alkyl radicals and together contain a total of 6 to 10 carbon atoms inclusive, $n$ is a number in the range 3 to 4 inclusive, $x$ is a number in the range 3 to 5 inclusive, $y$ is a number in the range 4 to 6 inclusive and the product $nx$ does not exceed $3y$.

Compounds having the above formula are readily made from the corresponding alkylated phenol by reacting the phenol with propylene oxide or butylene oxide until an average of about 3 to 5 mols of oxide have reacted with each mol of phenol and then reacting the product with ethylene oxide until an average of 4 to 6 mols of this oxide per mol of the original phenol have reacted. These reactions are well known and are carried out in any conventional manner for reacting alkylene oxides with hydroxy compounds.

Phenols suitable for use in making the compounds of the invention are the mono- or di-alkyl phenols wherein the total number of carbon atoms in the alkyl group or groups is 6 to 10 inclusive, such as dibutyl, diamyl, hexyl, octyl, decyl, ethyl butyl, butyl hexyl and ethyl octyl phenols. The alkyl substituents may be of any acyclic configuration, though we prefer the secondary alkyl phenols, and particularly, the branched chain secondary alkyl phenols such as are readily obtainable by the reaction of phenol with olefins such as diisobutylene, tripropylene and the like. The position of the alkyl groups on the aromatic nucleus is immaterial, though such alkylphenols are usually substituted in the 2 and/or 4-position.

In order that the product will have the desired surfactant properties, it is essential that a proper balance be maintained between the hydrophobic and the hydrophylic portions of the molecule. The former consists of the alkyl-phenyl-poly-oxypropylene or -oxybutylene group while the latter consists of the polyoxyethylene glycol chain. For this reason, the number of carbon atoms in the polyoxypropylene or polyoxybutylene chain should not exceed about 1.5 times the number in the polyoxyethylene chain, or, stated another way, $nx$ should not exceed $3y$ in the formula shown above.

The invention is illustrated by the following examples.

GENERAL PROCEDURE

One gram-mol of 2,4-di-sec-butylphenol and 3 g. of KOH were placed in an autoclave. The autoclave was evacuated and then heated to 120 degrees C. Propylene oxide was then pumped in at a rate sufficient to maintain the pressure at 10–30 p.s.i.g. while the temperature was maintained at 120–40 degrees C. and effective agitation was provided. A total of 4 mols of propylene oxide was pumped in, and when the pressure had dropped to zero, indicating substantially complete reaction, 5 mols of ethylene oxide were added in the same way. When reaction was complete, the catalyst was neutralized with $CO_2$ and the product was filtered to obtain a quantitative yield of product. It was a viscous oil, slightly soluble in water, readily soluble in acetone, methanol and benzene but insoluble in heptane. This product is listed as Example 1 in the table below, where some of its exceptional surfactant properties are shown.

The table shows some of the properties of seven typical products made in accordance with the invention, as well as two products (Examples 3 and 4) not in accord with the invention and included merely for comparative purpose. In the table, surfactant properties are shown at 3 concentrations of the products in distilled water. The contact angle measurements were made on carnauba wax and are advancing angles. The foaming tendency of the products was determined by measuring the height and stability of the foam generated by the Ross-Miles Method (Oil and Soap, 18, 99–102).

All the products listed in the table are viscous liquids, soluble in water and in most organic solvents other than aliphatic hydrocarbons.

As may be seen from the data in the table, the compounds of the invention are outstanding in that in concentrations as low as 0.001 percent in water they produce low surface tension and excellent wetting action on a wax surface, yet produce little or no stable foam. Such a combination of valuable properties is extremely desirable in many applications especially in the manufacture of agricultural spray concentrates. Since the concentration of the active parasiticide, herbicide, growth regulator or the like in the spray as applied is usually low, the surfactant compounded therewith is also likewise diluted in use. Hence, in the concentrate, the amount of surfactant may well equal the amount of the active parasiticide, etc. It is evident then, that any reduction in the required concentration of surfactant in the spray as applied constitutes a substantial reduction in the cost of the spray.

The compounds of the invention are particularly useful as wetting and spreading agents in herbicides, insecticides, fungicides and the like, where their outstanding wetting action on wax-like surfaces at very low concentrations is especially valuable. Thus, as little as 4 to 16 oz. per 100 gal. of spray, when added to a herbicidal spray such as sodium 2,2-dichloropropionate (Dalapon) or sodium trichloroacetate greatly increases the effectiveness of the herbicide and thus permits the use of lower concentrations of the latter. A similar effect is obtained with 2,4-D, DDT, Toxaphene, Lindane, and other common herbicides, insecticides, fungicides, and the like.

Table

Properties of Compounds 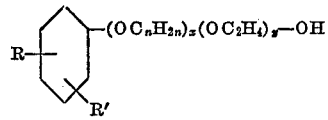

| Ex. No. | R | R' | $n$ | $x$ | $y$ | Percent OH | $d_{25}^{25}$ | $N_D^{25}$ | Conc., Percent | $\gamma$, Dynes/cm. | Contact Angle, ° 3 Min. | Foam, mm. 0 Min. | Foam, mm. 5 Min. |
|---|---|---|---|---|---|---|---|---|---|---|---|---|---|
| 1 | sec.-Butyl | sec.-Butyl | 3 | 4 | 5 | 2.96 | 1.0160 | 1.4773 | 0.1 | 30.2 | 40 | 9 | 6 |
|   |   |   |   |   |   |   |   |   | .01 | 30.7 |   |   |   |
|   |   |   |   |   |   |   |   |   | .001 | 38.9 | 74 | 6 | 0 |
| 2 | do | do | 4 | 3 | 5 | 3.83 | 1.0037 | 1.4789 | .1 | 30.1 | 54 | 10 | 6.5 |
|   |   |   |   |   |   |   |   |   | .01 | 31.9 | 52 |   |   |
|   |   |   |   |   |   |   |   |   | .001 | 35.7 | 77 | 5.5 | 0 |
| 3 | do | do | 2 | 5 | 5 |   |   |   | .1 | 30.3 | 37 | 95 | 35 |
|   |   |   |   |   |   |   |   |   | .01 | 34.3 |   |   |   |
|   |   |   |   |   |   |   |   |   | .001 | 54.4 | 104 | 22 | 5 |
| 4 | octyl[1] | H | 2 | 5 | 5 |   |   |   | .1 | 31.7 | 46 | 129 | 102 |
|   |   |   |   |   |   |   |   |   | .01 | 34.2 |   |   |   |
|   |   |   |   |   |   |   |   |   | .001 | 51.6 | 82 | 28 | 13 |
| 5 | do | H | 3 | 3 | 5 | 3.40 | 1.0240 | 1.4843 | .1 | 29.4 | 35 | 30 | 20 |
|   |   |   |   |   |   |   |   |   | .01 | 29.8 | 27 |   |   |
|   |   |   |   |   |   |   |   |   | .001 | 35.8 | 53 | 7 | 0 |
| 6 | do | H | 3 | 4 | 5 | 3.20 | 1.0240 | 1.4816 | .1 | 29.7 | 35 | 17 | 13.5 |
|   |   |   |   |   |   |   |   |   | .01 | 30.1 |   |   |   |
|   |   |   |   |   |   |   |   |   | .001 | 35.0 | 57 | 10 | 0 |
| 7 | do | H | 3 | 4 | 6 | 2.88 | 1.0310 | 1.4807 | .1 | 30.2 | 37 | 26 | 14 |
|   |   |   |   |   |   |   |   |   | .01 | 30.2 | 34 |   |   |
|   |   |   |   |   |   |   |   |   | .001 | 36.4 | 60 | 17 | 5 |
| 8 | do | H | 4 | 3 | 5 | 3.84 | 1.0140 | 1.4827 | .1 | 30.1 | 41 | 12 | 8 |
|   |   |   |   |   |   |   |   |   | .01 | 31.6 | 50 |   |   |
|   |   |   |   |   |   |   |   |   | .001 | 37.1 | 71 | 7 | 0 |
| 9 | tert.-Butyl | tert.-Butyl | 3 | 4 | 5 | 2.96 | 1.0240 | 1.4800 | .1 | 29.1 | 33 | 21 | 12 |
|   |   |   |   |   |   |   |   |   | .01 | 29.1 |   |   |   |
|   |   |   |   |   |   |   |   |   | .001 | 36.5 | 67 | 7 | 0 |

[1] The octylphenol used was a secondary, branched chain octyl derivative obtained by the reaction of phenol with diisobutylene and consisted predominantly of p-1,1,3,3-tetramethylbutylphenol.

We claim:

1. A cogeneric mixture of compounds corresponding to the formula

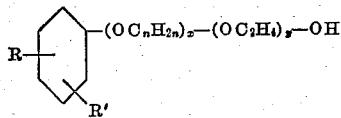

wherein R and R' are selected from the group consisting of hydrogen and alkyl radicals and together contain from 6 to 10 carbon atoms, $n$ is a number in the range of 3 to 4, $x$ is a number having an average value in the range 3 to 5, $y$ is a number having an average value in the range 4 to 6 and the product $nx$ does not exceed $3y$.

2. Compounds as defined in claim 1 wherein R and R' are alkyl radicals.

3. Compounds as defined in claim 1 wherein R and R' are butyl radicals.

4. Compounds as defined in claim 1 wherein R and R' are sec.-butyl radicals.

5. The compound as defined in claim 4 wherein $n$ is 3, $x$ is 4 and $y$ is 5.

6. Compounds as defined in claim 1 wherein R and R' are tert.-butyl radicals.

7. The compound as defined in claim 6 wherein $n$ is 3, $x$ is 4 and $y$ is 5.

8. Compounds as defined in claim 1 wherein R is hydrogen and R' is an alkyl radical.

9. Compounds as defined in claim 8 wherein R' is an octyl radical.

10. Compounds as defined in claim 1 wherein R' is a branched chain secondary octyl radical.

11. The compound as defined in claim 10 wherein $n$ is 3, $x$ is 4 and $y$ is 5.

12. The compound as defined in claim 10 wherein $n$ is 4, $x$ is 3 and $y$ is 5.

13. The compound as defined in claim 10 wherein $n$ is 3, $x$ is 3 and $y$ is 5.

References Cited in the file of this patent

UNITED STATES PATENTS

| 2,677,700 | Jackson et al. | May 4, 1954 |
| 2,759,867 | Melass | Aug. 21, 1956 |
| 2,786,796 | Melass | Mar. 26, 1957 |